United States Patent
Farah et al.

(10) Patent No.: US 7,647,904 B2
(45) Date of Patent: *Jan. 19, 2010

(54) VARIABLE CAM PHASER APPARATUS

(75) Inventors: Philippe S. Farah, Maisons-Laffitte (FR); Peter Baur, Trier (DE)

(73) Assignee: Delphi Technologies, Inc., Troy, MI (US)

( * ) Notice: Subject to any disclaimer, the term of this patent is extended or adjusted under 35 U.S.C. 154(b) by 156 days.

This patent is subject to a terminal disclaimer.

(21) Appl. No.: 11/652,396

(22) Filed: Jan. 11, 2007

(65) Prior Publication Data

US 2007/0169731 A1 Jul. 26, 2007

(30) Foreign Application Priority Data

Jan. 26, 2006 (GB) .................................. 0601590.3
Nov. 30, 2006 (EP) .................................. 06256132

(51) Int. Cl.
*F01L 1/34* (2006.01)
(52) U.S. Cl. .................. 123/90.17; 123/90.15; 464/160
(58) Field of Classification Search ............. 123/90.15, 123/90.16, 90.17, 90.18, 90.11; 464/1, 2, 464/160
See application file for complete search history.

(56) References Cited

U.S. PATENT DOCUMENTS 6,302,073 B1 * 10/2001 Heer ........................ 123/90.17

* cited by examiner

*Primary Examiner*—Ching Chang
(74) *Attorney, Agent, or Firm*—Thomas N. Twomey

(57) ABSTRACT

A cam phaser apparatus comprising a triple member gear system for transferring a driving torque from a drive member to a driven member and for selectively adjusting the angular relationship between the drive and driven members, said triple member gear system comprising a first member comprising a driving part, a second member comprising a driven part connectable to a cam sprocket or pulley, and a third member comprising an adjusting means connectable to a camshaft, said third member being connected to means for rotating said third member or applying a braking torque and/or a motoring torque to said third member to vary the angular relationship between the first and second members, wherein the cam phaser apparatus further comprises a selectively actuable coupling means for selectively coupling two of said first, second and third members. In one embodiment the coupling means comprises a magnetic coupling.

11 Claims, 3 Drawing Sheets

VARIABLE CAM PHASER APPARATUS

RELATIONSHIP TO OTHER APPLICATIONS AND PATENTS

The present invention claims the benefit of pending EP Patent Application Serial Number 06256132.9, filed Nov. 30, 2006, and claims the benefit of GB Provisional Patent Application Serial Number 0601590.3, filed Jan. 26, 2006.

TECHNICAL FIELD OF INVENTION

The present invention relates to a cam phaser apparatus, particularly, but not exclusively a variable cam phaser apparatus used in valve trains of automobile engines.

BACKGROUND OF INVENTION

It is desirable to be able to adjust the cam phase (i.e. the angular relationship between the crankshaft and the camshaft) of engines during engine operation in order to vary the timing of the opening and closing of the inlet and/or exhaust valves to improve engine performance, emissions and/or fuel consumption. Various types of arrangements exist that are capable of achieving this adjustment. Such system are required to efficiently convert rotational movement from the crankshaft into rotational movement of the camshaft whilst allowing dislocation between these rotational movements in order to allow variation of the cam phase.

Current systems typically utilize hydraulic actuators using high pressure oil to enable relative angular displacement between drive and driven members (e.g. cam sprocket or pulley and camshaft) of the valve train. Such systems have difficulty operating at extremes of temperature, in particular during engine start up when the oil is cold, due to temperature related viscosity changes of the oil.

Whilst attempts have been made to design electrically actuated variable cam phase arrangement, such usually require a complex triple shaft arrangement such as planetary gears or a harmonic drive arrangement. The complex arrangement of such triple shaft systems can introduce controllability and reliability problems and generally suffer from high power consumption.

Examples of triple shaft gear systems suitable for use with a cam phaser comprise planetary gear systems (as shown in FIG. 1), with a sun gear 1 planetary gears 2 mounted on a planet carrier 3 and ring gear 4, or harmonic drive systems (as shown in FIG. 2), with a wave generator 1', flex-spline 2' and circular spline 3'.

Another form of triple member system equivalent to a planetary gear system comprises a magnetic gear having an outer ring comprising a plurality of magnets (equivalent to the ring gear), a concentric inner ring comprising a plurality of circumferentially spaced magnets (equivalent to a sun gear) and an intermediate ring or carrier member mounted in an annular space between said outer and inner rings and comprising a plurality of circumferentially spaced pole pieces (equivalent to planetary carrier upon which a plurality of planetary gears are mounted).

Typically, where such triple shaft gear systems are applied to a cam phaser of an engine, one shaft is connected to the cam sprocket or pulley to comprise a drive member (typically the planet carrier or circular spline) and a second shaft is connected to the camshaft (typically the ring gear or the flex-spline) to comprise a driven member, the remaining third shaft (typically the sun gear or wave generator) being connected to an actuator for varying the cam phase (i.e. the angular relationship between the drive and driven members).

A particular problem with such known triple shaft gear systems is that the position and/or angular velocity of the third shaft must be controlled at all times to prevent uncontrolled cam phase change. Hence the actuator, typically an electric motor, must be powered at all times, leading to increased power consumption.

SUMMARY OF THE INVENTION

According to the present invention there is provided a cam phaser apparatus comprising a triple member gear system, such as a planetary gear system, harmonic drive or magnetic gear, for transferring a driving torque from a drive member to a driven member and for selectively adjusting the angular relationship between the drive and driven members, said triple member gear system comprising a first member comprising a driving part of said triple member gear system, a second member comprising a driven part of said triple member gear system connectable to a cam sprocket or pulley, and a third member comprising an adjusting means of said triple member gear system connectable to a camshaft, said third member being connected to means for rotating said third member or applying a braking torque and/or a motoring torque to said third member to vary the angular relationship between the first and second members, wherein the cam phaser apparatus further comprises a selectively actuable coupling means for selectively coupling two of said first, second and third members.

By coupling two of the three members together, all three members are constrained to rotate synchronously, preventing alteration of the cam phasing.

Preferably said coupling means comprises a magnetic coupling, more preferably an electromagnetic coupling.

The coupling means may comprise first and second rotatably mounted coaxial members, a first member connected to one of said three members of the triple member gear system, a second member connected to another of said three members of the triple member gear system, said first and second members being spaced apart from one another, one of said first and second members comprising at least one magnetically conductive region and the other of said first and second members incorporating means for selectively generating a magnetic flux to constrain the first and second members to rotate together. Preferably said means for selectively generating a magnetic flux comprises a solenoid.

In one embodiment said first and second members of said coupling means respectively comprise concentrically arranged inner and outer rotors having a radial gap therebetween. In an alternative embodiment said first and second members of said coupling means comprise axially spaced members having respective axially spaced opposing face portions.

It is also envisaged that the coupling means may comprise a selectively actuable mechanical coupling, such as a mechanical clutch arrangement.

BRIEF DESCRIPTION OF DRAWINGS

Embodiment of the present invention will now be described, by way of example only, with reference to the accompanying drawings, in which.

DETAILED DESCRIPTION OF INVENTION

Figure 1:
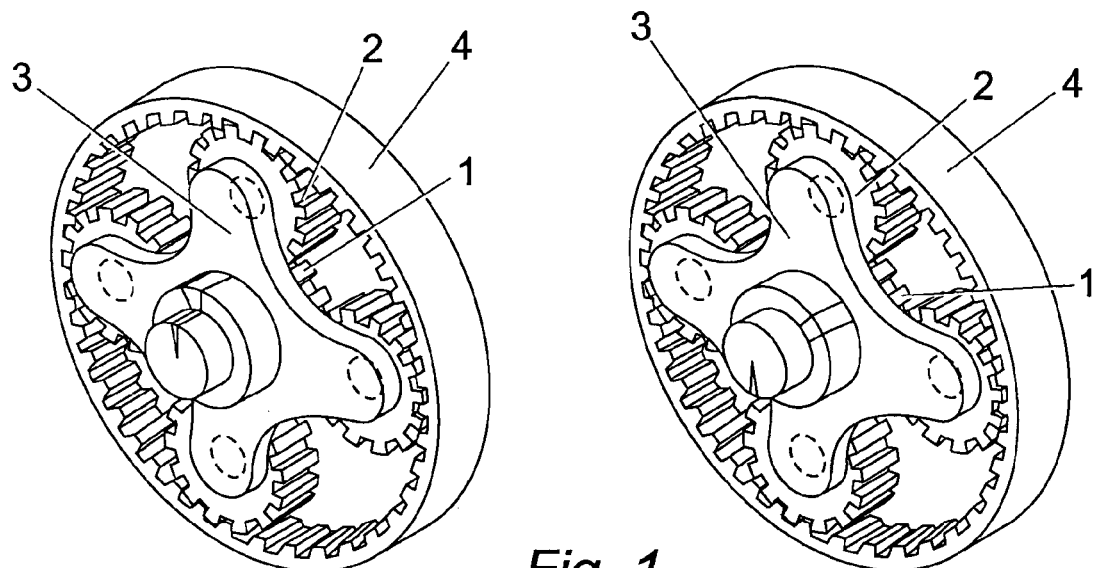
FIG. 1 is a perspective view of a planetary gear system known for use in a cam phaser.
Figure 2:
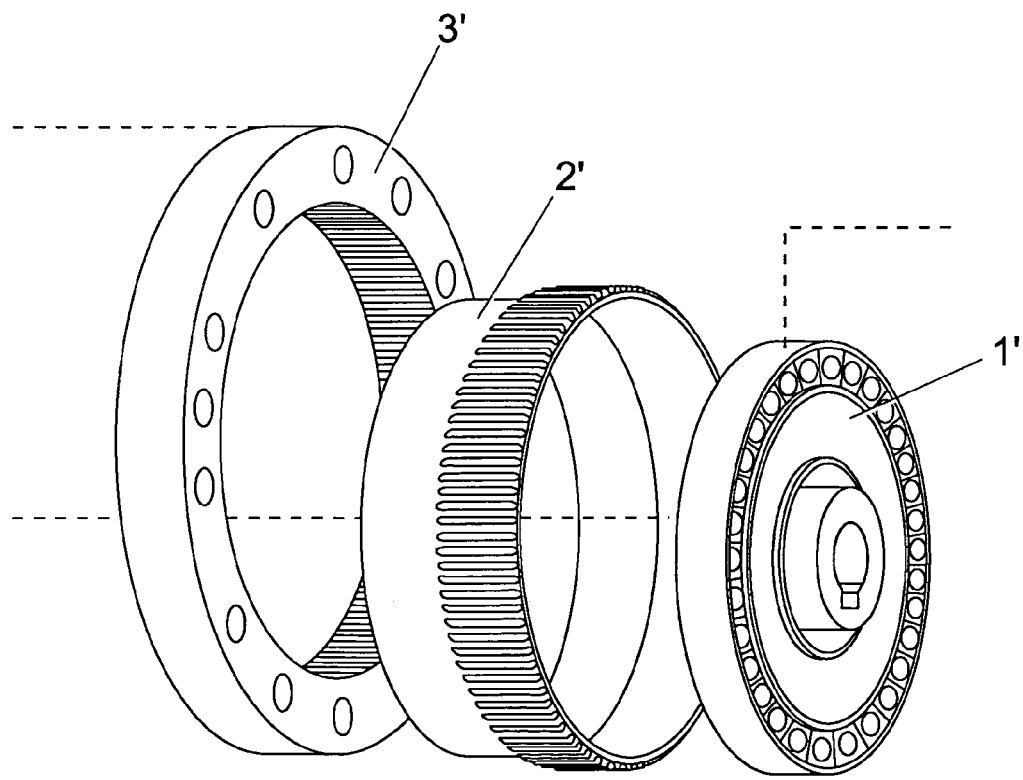
FIG. 2 is a perspective view of a harmonic drive system known for use in a cam phaser.
Figure 3:
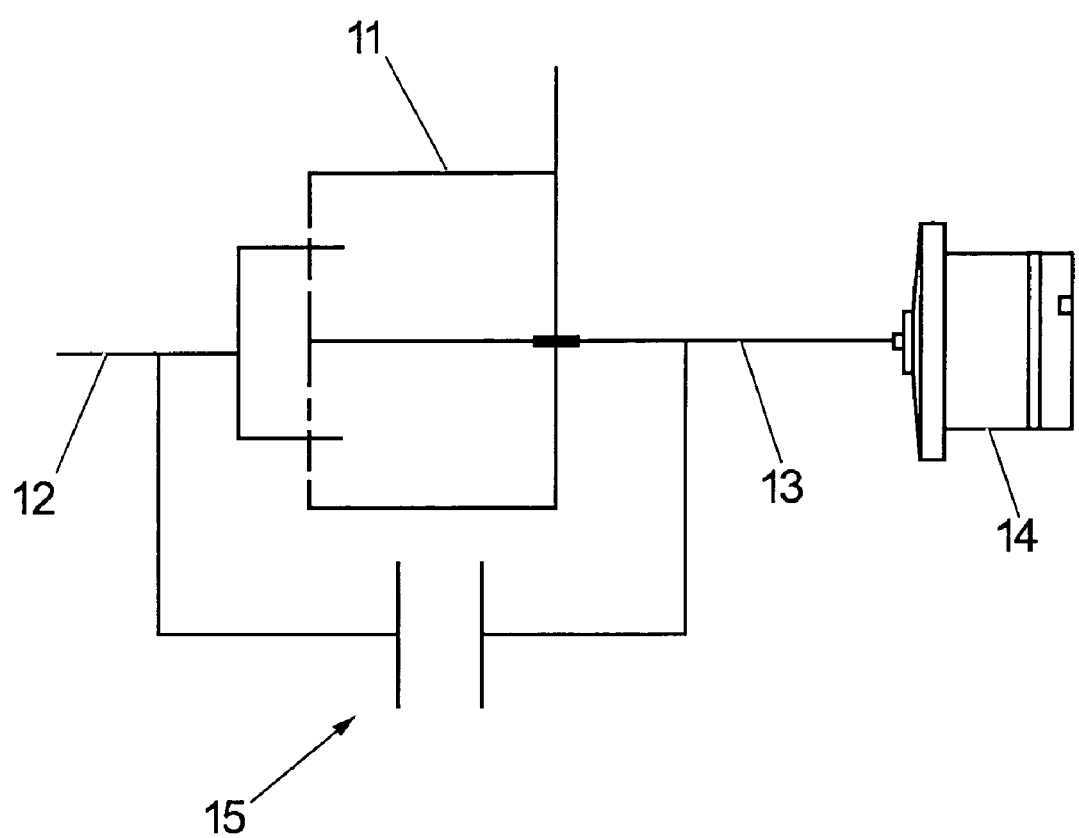
FIG. 3 is a schematic view of a cam phaser apparatus according to an embodiment of the present invention.

As illustrated in FIG. 3, the cam phaser apparatus includes a first member 11 of a triple member gear system, said first member 11 being connected to a crankshaft of the engine via a pulley or cam sprocket and an endless belt or chain. In the case of a planetary gear system, such first member 11 could be the planet carrier and planetary gears. In the case of a harmonic drive, the first member 11 could be the circular spline. In the case of a magnetic gear, the first member 11 could be the intermediate ring or pole pieces.

The camshaft of the engine is connected to a second member 12 of the triple member gear system. In the case of a planetary gear system the second member 12 could be the ring gear. In the case of a harmonic drive, the second member 12 could be the flex-spline. In the case of a magnetic gear, the second member 12 could be the outer ring.

A third member 13 of the triple member gear system is connected to an electric motor 14 for altering the cam phase of the engine. In the case of a planetary gear system, the third member 13 could be the sun gear. In the case of a harmonic drive, the third member 13 could be the wave generator. In the case of a magnetic gear, the third member 13 could be the inner ring. The housing of the motor is fixed with respect to the cylinder head while the rotor of the motor rotates with the camshaft.

When it is desired to advance the cam phase of the camshaft, a braking torque is applied to the third member 13 by the electric motor 14 to decelerate the third member 13 thus advancing the camshaft angle with respect to the crankshaft.

When it is desired to retard the cam phase of the cam shaft, a motoring torque is applied to the third member 13 by the electric motor to accelerate the third member 13 thus retarding the camshaft angle with respect to the crankshaft.

When no advance is required it would formally have been necessary to maintain power to the motor 14 to ensure that the motor 14 compensates for the natural tendency of the motor to decelerate due to frictional losses. To avoid this, a magnetic coupling means 15 is provided between the second member 12 and the third member 13 to selectively couple the second and third members 12, 13 together, causing all three member to rotate together at the same speed.

Figure 4:
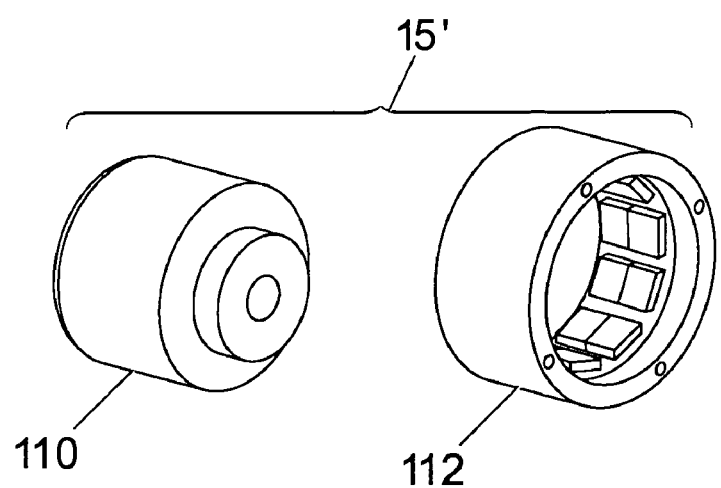
FIG. 4 is an exploded view of a magnetic coupling of a cam phaser apparatus according to a first embodiment of the present invention.

In a first embodiment, as illustrated in FIG. 4, the magnetic coupling means 15' comprising an inner rotor 110 and a concentrically arranged outer rotor 112 an annular gap being defined between said inner and outer rotors 110, 112 whereby the two rotors can rotate independently. The inner rotor 110 is connected to one of the second and third members (or possibly even the first member) and the outer rotor 112 is connected to the other of the second and third members. Both inner and outer rotors may comprise either permanent magnets or electromagnets through an electrically driven coil to generate magnetic flux interaction between the inner and outer rotors to transfer torque between the inner and outer rotors and lock the inner and outer rotors together.

Figure 5:
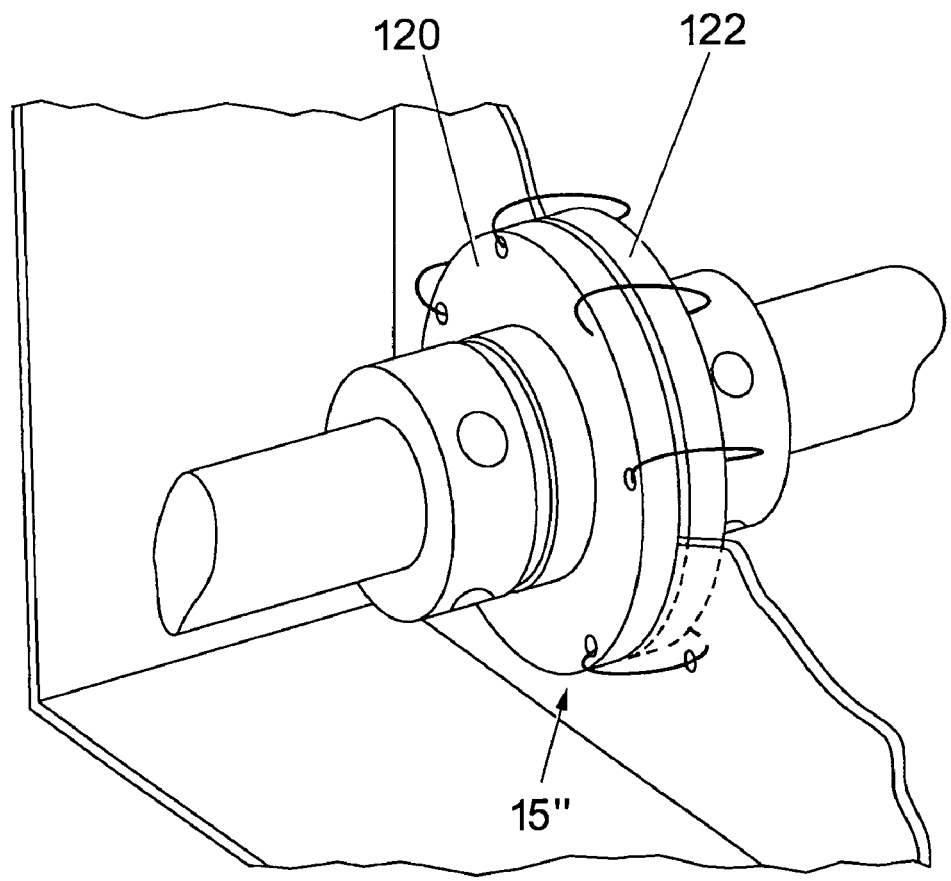
FIG. 5 is a perspective view of a magnetic coupling according to a second embodiment of the present invention.

In a second embodiment, as illustrated in FIG. 5, the magnetic coupling means 15" comprises axially spaced first and second members 120, 122 having respective face members axially spaced from one another to define cooperating face portions. Both discs will include either permanent magnets or electromagnets through an electrically driven coil to generate magnetic flux interaction between the inner and outer rotors to transfer torque between the inner and outer rotors and lock the inner and outer rotors together.

We claim:

1. A cam phaser apparatus comprising a triple member gear system for transferring a driving torque from a drive member to a driven member and for selectively adjusting the angular relationship between the drive and driven members, said triple member gear system comprising a first member comprising a driving part of said triple member gear system, a second member comprising a driven part of said triple member gear system connectable to a cam sprocket or pulley, and a third member comprising an adjusting means of said triple member gear system connectable to a camshaft, said third member being connected to means for rotating said third member or applying a braking torque or a motoring torque to said third member to vary the angular relationship between the first and second members, wherein the cam phaser apparatus further comprises a selectively actuable coupling means for selectively coupling two of said first, second and third members.

2. A cam phaser apparatus as claimed in claim 1, wherein said coupling means comprises an electromagnetic coupling.

3. A cam phaser apparatus as claimed in claim 2, wherein the coupling means comprises first and second rotatably mounted coaxial members, a first member connected to one of said three members of the triple member gear system, a second member connected to another of said three members of the triple member gear system, said first and second members being spaced apart from one another, one of said first and second members comprising at least one magnetically conductive region and the other of said first and second members incorporating means for selectively generating a magnetic flux to constrain the first and second members to rotate together.

4. A cam phaser apparatus as claimed in claim 3, wherein said means for selectively generating a magnetic flux comprises a solenoid.

5. A cam phaser apparatus as claimed in claim 4, wherein said first and second members of said coupling means respectively comprise concentrically arranged inner and outer rotors having a radial gap therebetween.

6. A cam phaser apparatus as claimed in claim 4, wherein said first and second members of said coupling means comprise axially spaced members having respective axially spaced opposing face portions.

7. A cam phaser apparatus as claimed in claim 1, wherein the coupling means comprises first and second rotatably mounted coaxial members, a first member connected to one of said three members of the triple member gear system, a second member connected to another of said three members of the triple member gear system, said first and second members being spaced apart from one another, one of said first and second members comprising at least one magnetically conductive region and the other of said first and second members incorporating means for selectively generating a magnetic flux to constrain the first and second members to rotate together.

8. A cam phaser apparatus as claimed in claim 7, wherein said means for selectively generating a magnetic flux comprises a solenoid.

9. A cam phaser apparatus as claimed in claim 8, wherein said first and second members of said coupling means respectively comprise concentrically arranged inner and outer rotors having a radial gap therebetween.

10. A cam phaser apparatus as claimed in claim 8, wherein said first and second members of said coupling means comprise axially spaced members having respective axially spaced opposing face portions.

11. A cam phaser apparatus as claimed in claim 1, wherein said coupling means comprises a selectively actuable mechanical coupling.

* * * * *